Aug. 5, 1969   F. G. REA   3,459,995

RMS SENSING CIRCUIT

Filed May 27, 1966

INVENTOR
FRED G. REA

BY
Smythe & Moore
ATTORNEYS

United States Patent Office 3,459,995
Patented Aug. 5, 1969

3,459,995
RMS SENSING CIRCUIT
Fred G. Rea, Watertown, Wis., assignor to Sola Basic Industries, Inc., Milwaukee, Wis., a corporation of Wisconsin
Filed May 27, 1966, Ser. No. 553,375
Int. Cl. H05b 37/00, 39/00, 41/14
U.S. Cl. 315—200  9 Claims

ABSTRACT OF THE DISCLOSURE

A RMS sensor circuit wherein a resistance element which changes resistance with temperature, such as a lamp bulb, is alternately heated by a rectified A.C. voltage to be sensed and then sensed by solid state circuitry means providing output signals proportional to the variation of the rectified A.C. voltage from a reference voltage, an important aspect being that the resistance element combines heating, heat storage, and change of resistance with heating in a single element. The circuitry further provides for automatic heating and sensing during portions of each half cycle of the applied A.C. voltage, and in a modified version, provides a control for an electric range or like heating element.

---

This invention relates to sensing circuits and more especially to one of the thermal RMS type.

While it is known in the prior art to develop a D.C. signal proportional to a signal to be sensed by a thermal RMS circuit, the present invention distinguishes from such art in that the same element is used for heating, heat storage, and temperature sensing by resistance change with temperature, and in that the resulting signal is independent of the wave form of the sensed voltage or current. Prior devices have not provided such a signal in a satisfactory manner.

A principal object of the present invention, therefore, is to provide a new and relatively simple sensing means for providing an output signal by the thermal RMS method that is independent of the wave form of the sensed signal.

A further object of the invention is to provide a sensing means of the character above described in which a single element is used for heating, heat storage, and temperature sensing by resistance change with temperature.

A further object is to provide a sensing means as above described in which a lamp bulb serves as the sensing element.

A still further object is to provide a simple sensing circuit that can be adapted to provide the control of an electric heating device such as the heating element of an electric range.

In one aspect, the invention comprises a resistance element such as a light bulb in which the resistance is proportional to the heat power being dissipated, a D.C. bridge network for heating such element in accordance with an A.C. current to be sensed whereby the temperature and resistance of the element depend upon the RMS value of the sensed current, a standard comparison voltage, and a transistor circuit means for providing an output signal proportional to differences between the sensed current and a current produced by the standard comparison voltage.

The above and other objects, features and advantages of the invention will be apparent from the following description taken in connection with the accompanying drawings which exemplify a preferred embodiment of the invention, and in which.

Figure 1:
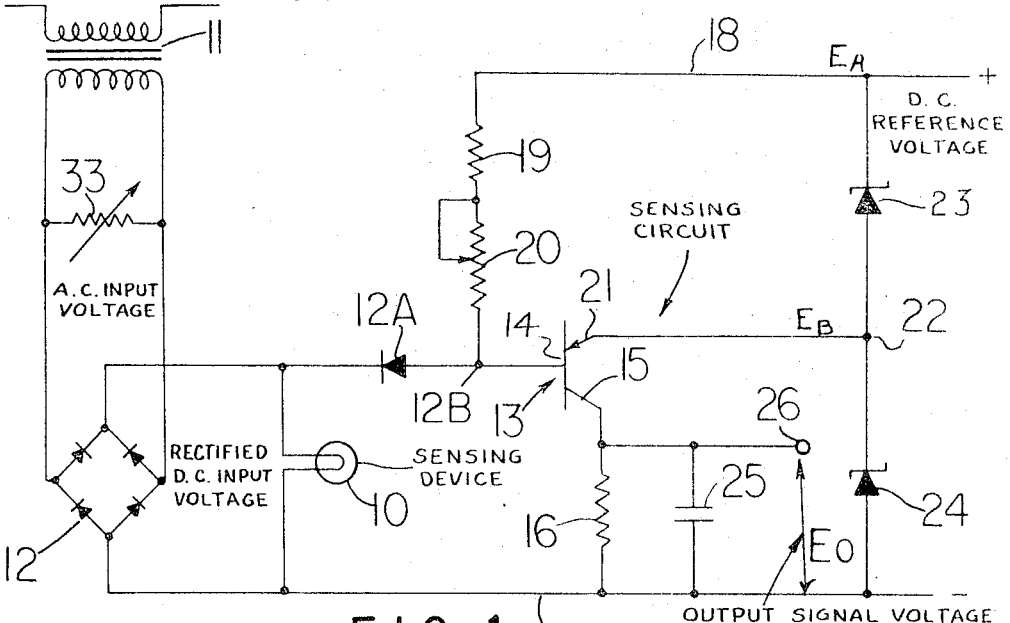
FIG. 1 is a schematic wiring diagram of sensing circuits and devices for carrying out the invention.

Referring to the drawing of FIG. 1, there is shown a sensing device 10 which is connected to an A.C. current or voltage to be sense by a current or voltage transformer 11 and a full-wave rectifier 12. The sensing device 10, as illustrated, in theform of an incandescent light bulb in which the resistance is proportional to the temperature of the bulb caused by the power being dissipated. It is to be understood, however, that devices other than incandescent bulbs could be used, such, for example, as a Nichrome heating wire, the word "Nichrome" being a trademark of the Driver Harris Co. of Harrison, N.J., or a similar heating element, the important factor being that the same element serves for heating, heat storage, and resistance change with heating.

The light bulb or sensing device 10 is connected through a diode 12A to the base 14 of a transistor 13 having its collector 15 connected through a resistor 16 to a line 17 providing a return path to bulb 10. A second or emitter path through the transistor 13 is provided by a line 18, resistor 19, adjustable resistor 20, base 14 and emitter 21 connected to a point 22 between two Zener diodes 23 and 24. Line 18 is connected to a suitable source of D.C. power to provide a constant reference voltage $E_A$ with respect to line 17, and Zener diodes 23 an 24 provide an intermediate voltage $E_B$ at point 22. The current from collector 15 of transistor 13 through resistor 16 develops an output signal voltage $E_O$ across terminal 26 and line 17. Capacitor 25 filters said output voltage as needed. The output voltage $E_O$ can be used in any desired control or the like circuit such, for example, as the constant current system of copending application Ser. No. 553,376, filed May 27,1966.

The operation of the device thus far described can be briefly stated as follows:

During the period of time or half cycles when the instantaneous value of the input voltage applied to bridge 12 by transformer 11 is greater than reference voltage $E_A$ at point 12B, diode 12A is non-conducting and the rectified D.C. input voltage is applied directly across light bulb 10, causing light bulb 10 to dissipate a certain amount of power and to be at a temperature proportional to this power and the RMS of the applied voltage or current being sensed. During the remaining period of the half cycle when the applied input voltage to bridge 12 is less than the reference voltage $E_A$ at point 12B, bridge 12 is non-conducting, diode 12A conducts, and light bulb 10 serves as a resistive connection between the base 14 of transistor 13 and line 17. This permits a current to flow from the base 14 through the light bulb 10 and back to the base through collector 15. Simultaneously, a standard or comparison current is flowing toward the base from line 18 through the resistors 19 and 20, such current being equal to $E_A-E_B$ divided by the resistance of resistors 19 and 20. The resistance of resistor 20 can be varied to adjust or calibrate the comparison current. During this interval of time, therefore, the net current to or from the base of transistor 13 is equal to the difference between the current through resistors 19 and 20 and the current through the resistance of light bulb 10. Since the resistance of light bulb 10 will be proportional to its operating temperature, the net base current is an indication of the RMS of the applied A.C. voltage to the circuit. This base current causes a proportional current through the emitter to the collector circuit of transistor 13 and resistance 16, thus charging capacitor 25 to provide a signal voltage across the capacitor 25. By adjusting resistor 20, the output signal voltage may be zero for a given value of A.C. input voltage or current. Adjustable shunting means 33 may be used to provide additional adjusting means by changing the total burden on transformer 11.

Figure 2:
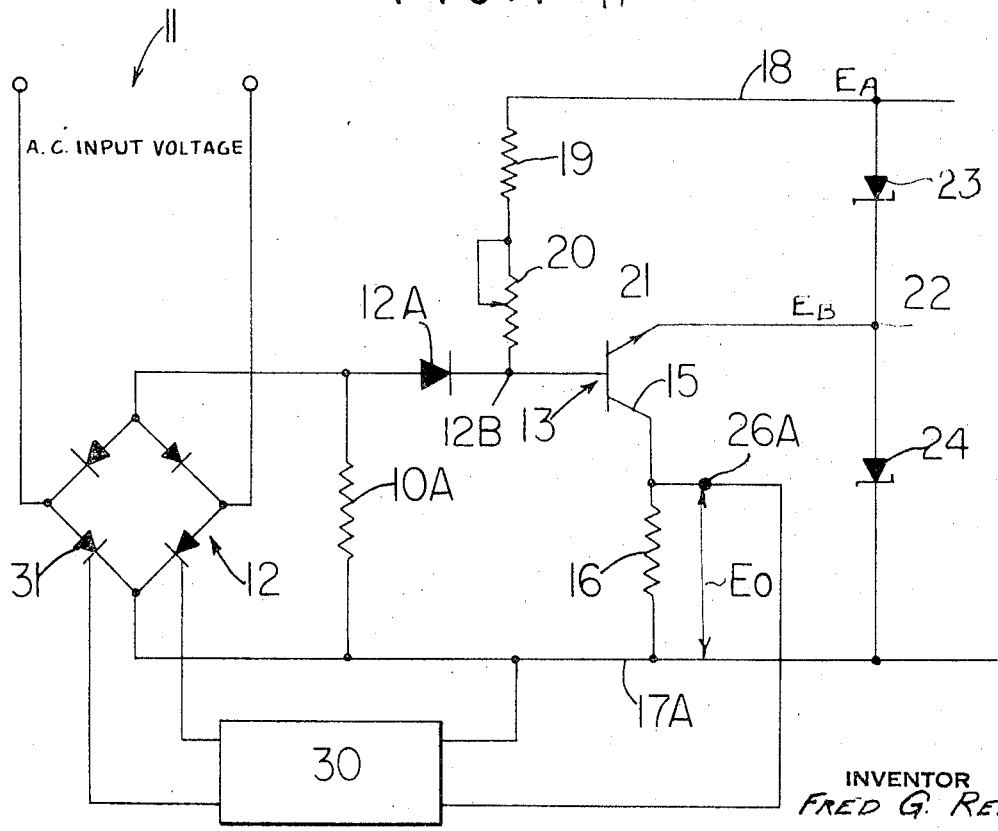
FIG. 2 is a schematic wiring diagram of another form of the invention.

The output voltage can be used for any desired purpose, such as to provide a fine control for a constant current regulator as set forth in the aforesaid copending application Ser. No. 553,376, or to control a heating element, as can be seen in FIG. 2, wherein the same parts are given the same numbers.

In this last mentioned use or adaptation, the electric heating element or a range, oven, or other heating apparatus would be used as the resistance element 10A of the drawings, and the output signal voltage between point 26A and line 17A would be used to control an amplifier and/or firing circuit 30 or the like to drive silicon controlled rectifiers (SCR) or similar means. Thus, during the "off" portion of the half cycle, the heating element resistance is used to sense temperature and to control the voltage applied during the remainder of a half cycle. This gives good regulation of the heater temperature regardless of the load conducting heat away from the element, and requires no additional temperature sensing element such as a thermostat or thermistor. Calibrating resistor 20 of the transistor circuit can be used to provide selective heats for the heater.

It will be evident that other modifications, changes and adaptations of and in the illustrated embodiment can be made without departing from the spirit of the invention, and it is intended to be limited only be the scope of the appended claims.

What is claimed is:

1. In a RMS sensing circuit, the combination including rectifier means, means for connecting an A.C. voltage to be sensed to said rectifier means, a resistance element connected across the output of said rectifier means, said element having a temperature-resistance characteristic such that the temperature varies with the power applied by said rectifier and the resistance varies with temperature, means for sensing the resistance of said element and providing output voltages which are a function of said resistance, and means for alternately heating said element by said rectifier means and then sensing the resistance of the element.

2. A combination as set forth in claim 1 in which said resistance element comprises a lamp bulb.

3. A combination as set forth in claim 1 in which said last named means provides for alternately heating and sensing said element during each half cycle of the A.C. voltage to be sensed.

4. A combination as set forth in claim 1 in which said sensing means includes a transistor having a base current circuit through said element and a second circuit for feeding a comparison current to said base.

5. A combination as set forth in claim 4 in which an adjustable resistance is connected in the circuit for said comparison current to regulate the value of the current.

6. A combination as set forth in claim 4 in which a resistance and a shunt capacitor are connected in the collector-emitter circuit of said transistor to provide the output voltage.

7. A combination as set forth in claim 4 in which said sensing means includes a diode connected in said base current circuit, said diode being forward biased in the direction of said transistor base.

8. A combination as set forth in claim 1 in which said means for alternately applying power to and sensing the resistance of said element includes a diode connected between one side of the element and a source of D.C. voltage having an amplitude less than the maximum amplitude of the voltage wave supplied by said rectifier.

9. A combination as set forth in claim 1 in which said resistance element comprises an electrical heating element and said output voltage from said sensing means is connected to means for controlling the A.C. voltage applied to said rectifier means.

References Cited

UNITED STATES PATENTS

| 3,277,312 | 10/1966 | Harris | 307—88.5 |
| 3,281,689 | 10/1966 | Schneider et al. | 324—132 |
| 3,303,423 | 2/1967 | Staschover et al. | 324—106 |
| 3,361,931 | 1/1968 | Vollrath | 315—158 |

JOHN W. HUCKERT, Primary Examiner
S. BRODER, Assistant Examiner

U.S. Cl. X.R.
315—194, 195, 198, 208